Dec. 3, 1940.   H. L. CHISHOLM, JR   2,223,406
AUTOMOBILE TRANSMISSION CONTROL
Filed March 29, 1939      5 Sheets-Sheet 1

Inventor
HARRY L. CHISHOLM, JR.

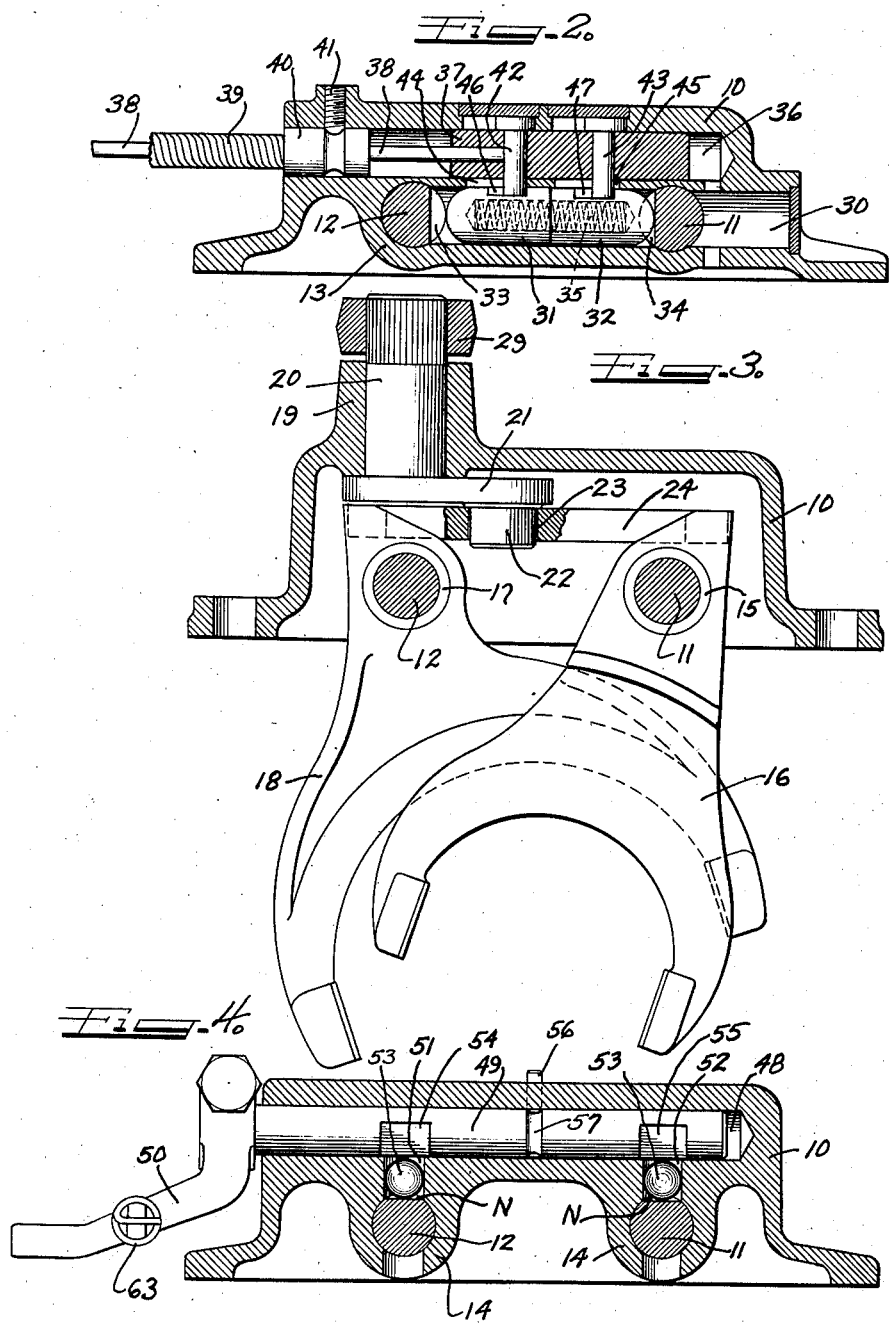

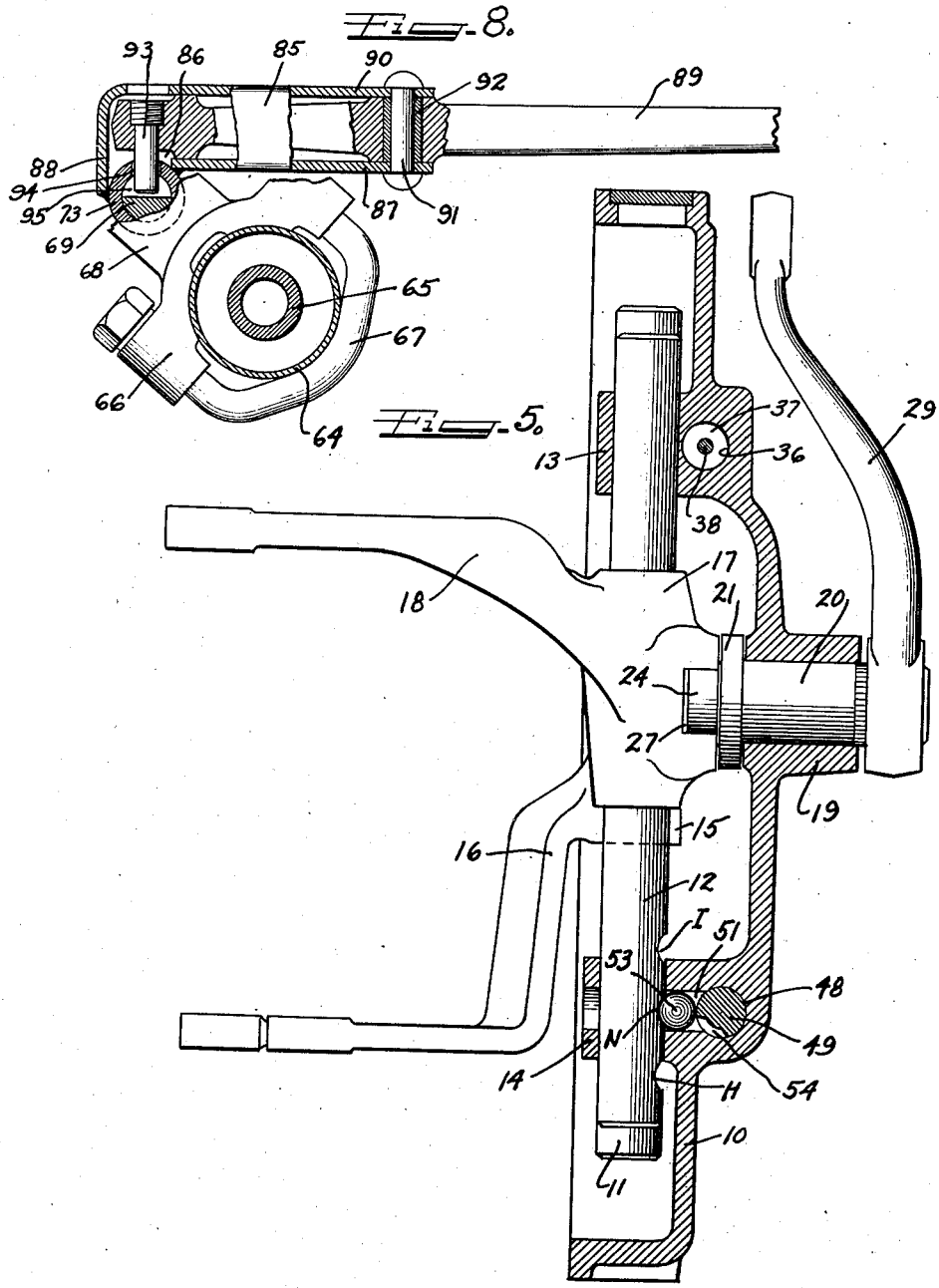

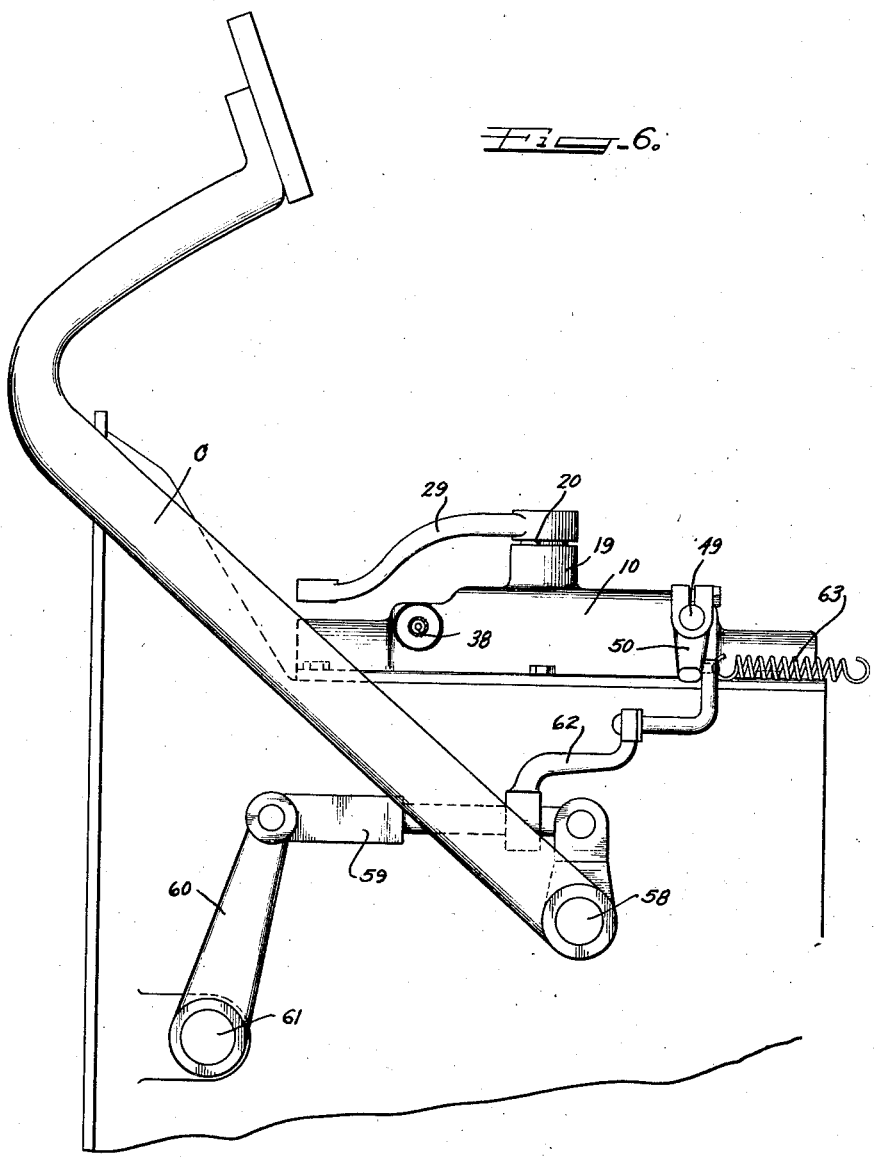

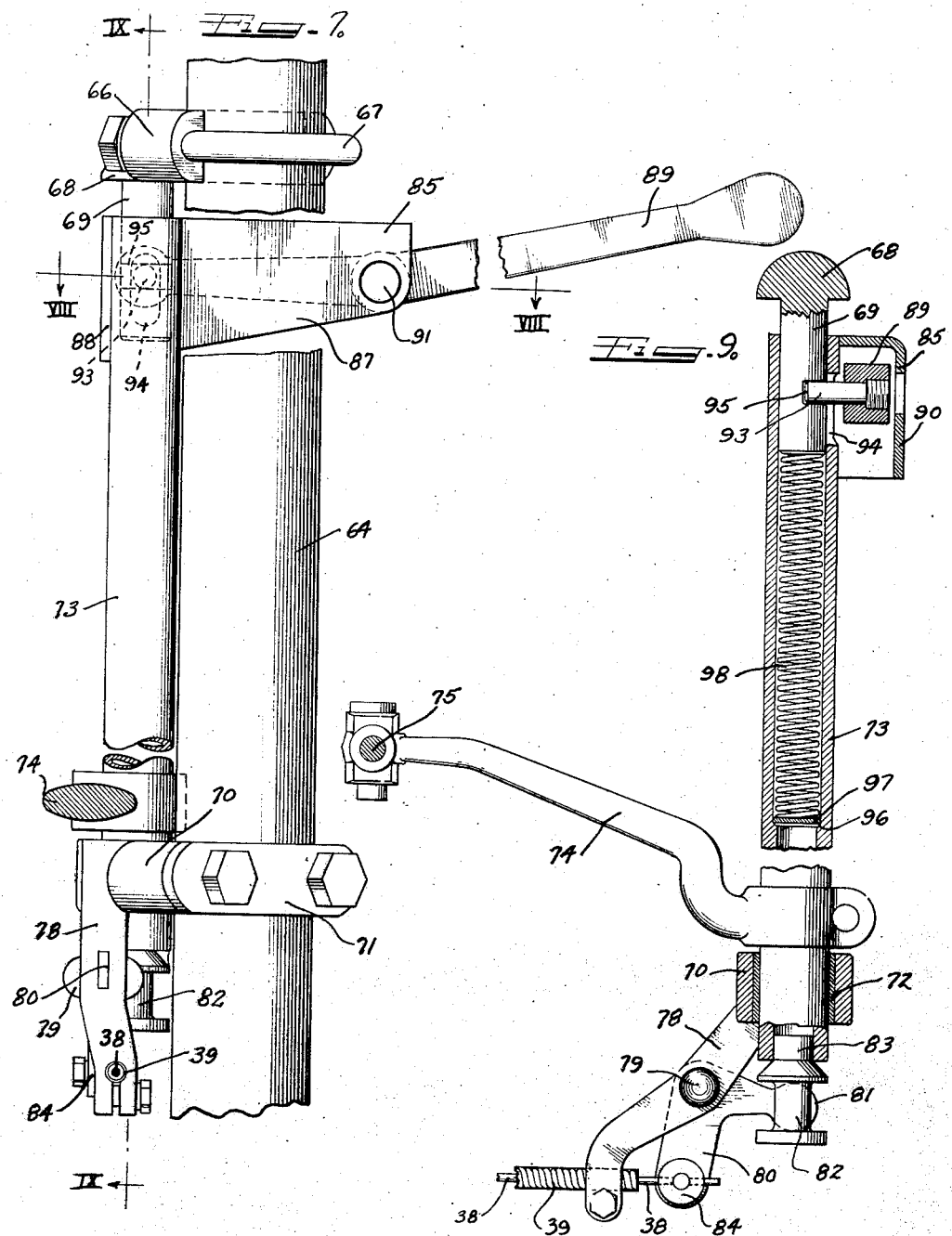

Patented Dec. 3, 1940

2,223,406

UNITED STATES PATENT OFFICE 2,223,406

AUTOMOBILE TRANSMISSION CONTROL

Harry L. Chisholm, Jr., Buffalo, N. Y., assignor to Houde Engineering Corporation, Buffalo, N. Y., a corporation of New York Application March 29, 1939, Serial No. 264,679

6 Claims. (Cl. 74—473)

This invention relates to transmission control in automotive vehicles and particularly to that type of control in which selection for a desired transmission speed and shifting of the selected transmission gearing is accomplished by different movements of a manual control lever mounted adjacent to the steering wheel of the vehicle.

An important object of the invention is to provide simplified means normally effective to hold the supports for the shifter forks in neutral position, but which may be set by manual operation of the control lever at the steering wheel for releasing one of the shifter fork assemblies for operation and locking the other shifter fork assembly against operation and in neutral position.

A further important object is to provide improved and simplified means for locking the shifter fork assemblies in any of their set or shifted positions while the clutch is engaged and to unlock the shifter assemblies only when the clutch is disengaged.

Another important object is to provide simplified shift controlling structure operable to effect unequal shifting distances of the forward and reverse speed fork structure and the second and high speed fork structure by equal strokes or movements of the manual control lever at the steering wheel.

Further objects of the invention are to provide for direct connection between the control lever at the steering wheel and the selection and shifting structure on the transmission housing and to reduce friction and resistance to a minimum so that minimum manual effort will be required to operate the control lever for selection and shifting.

The above referred to and other features of the invention are incorporated in the structure shown on the accompanying drawings, in which drawings—

Figure 2 is a section on plane II—II of Figure 1;

Figure 3 is a section on plane III—III of Figure 1;

Figure 4 is a section on plane IV—IV of Figure 1;

Figure 5 is a section on plane V—V of Figure 1;

Figure 6 is a side elevation of the transmission housing with my improved selection and shifting structure mounted thereon and showing the connection of the clutch lever with the shifter rail locking structure;

Figure 7 is a front elevation of the automobile steering column and my improved manual control lever and parts operative thereby mounted thereon;

Figure 8 is a plan view of the structure shown in Figure 7 but with the control lever housing shown in section on plane VIII—VIII of Figure 7; and Figure 9 is a side elevation partly in section on plane IX—IX of Figure 7.

Figure 1:
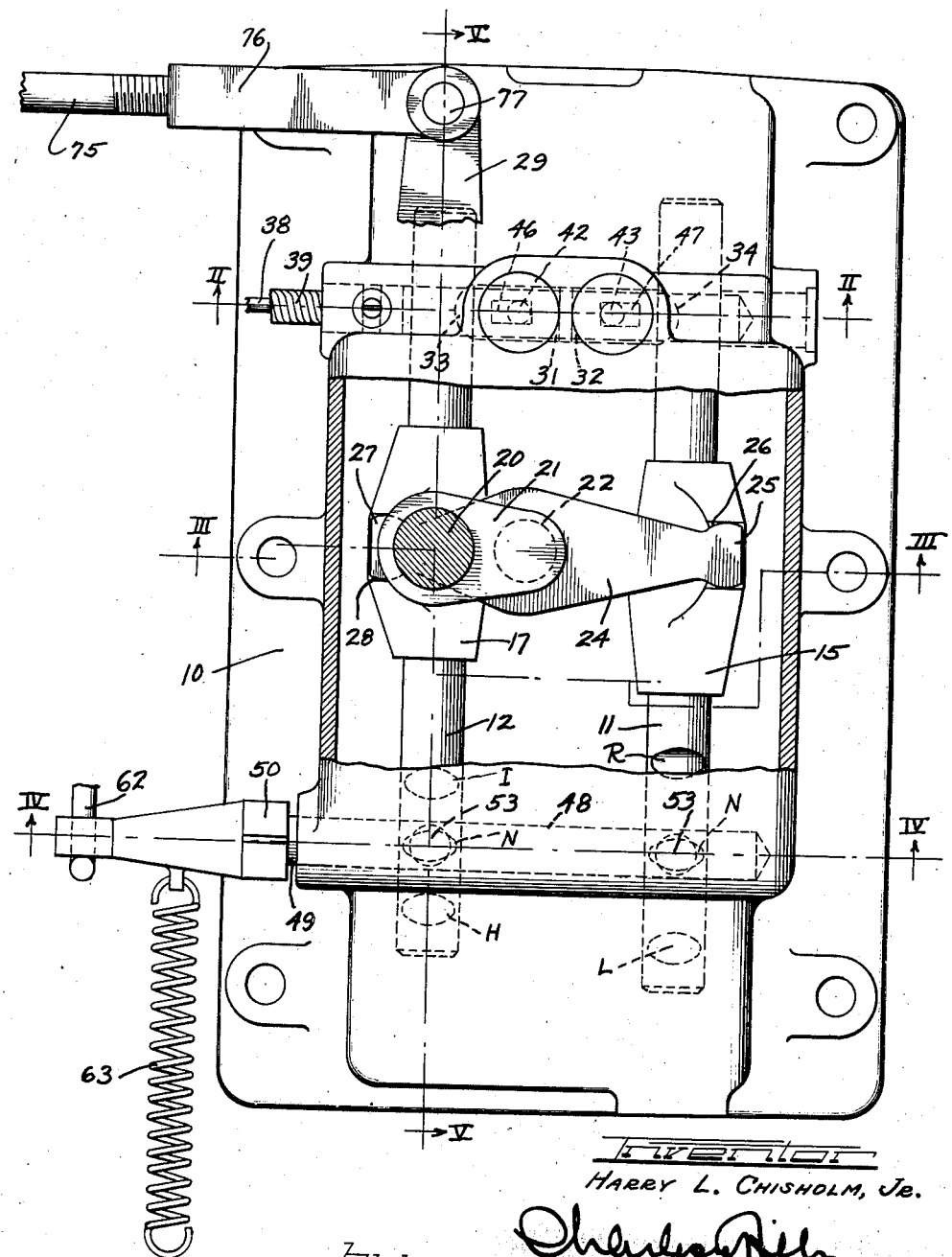
Figure 1 is the plan view of a cover structure containing the selection and shifting means and which can be substituted for the cover structure ordinarily applied on the transmission housing and supporting the shift lever extending upwardly from the car floor.

Referring to Figures 1 to 5, 10 represents a cover structure which may be substituted for the cover ordinarily applied on the transmission casing for supporting the shift lever. Longitudinally extending parallel shifter rails 11 and 12 are mounted in lugs 13 and 14 depending from the top of the cover structure 10, the rail 11 having secured thereto the shifter head 15 from which the shifter fork 16 depends, the rail 12 having secured thereto the shifter head 17 from which the shifter fork 18 depends, the fork 16 serving to shift the gearing (not shown) for low or reverse speeds, and the fork 18 serving to shift the gearing for second or high speeds.

Above the rail 12, the cover 10 has the upwardly extending bearing boss 19 for a stub shaft 20 at the lower end of which a crank lever 21 is secured, a pivot stud 22 extending downwardly on the inner end of the lever for engagement in the opening 23 of a floating plate or lever 24. The lever 24 is supported by the shifter fork heads 15 and 17 and at one end has the semi-circular head 25 engaging in a recess 26 in the head 15, and at its other end has the semi-circular head 27 engaging in the recess 28 in the head 17. At its other end the shaft 20 has secured thereto a lever 29. With the arrangement described, when one of the rails is locked and the other rail unlocked, and the lever 29 is swung, the lever 24 will be fulcrumed on the head of the locked rail and will be swung to shift the unlocked head and rail. In the usual type of transmission, the shifting for low or reverse speeds is through a greater distance than shifting for second or high speeds. In order that shifting for all speeds may be accomplished by equal distances of swing of the lever 29, the pivot connection between the crank arm 21 and the lever 24 is displaced from the center of the lever 24 and is closer to the rail 12, the off-center distance being such that for equal swing distances of the lever 29, the respective rails will be shifted their proper distances. Describing now the mechanism for selecting the shifter rails for shifting operation, the boss 13 through which the rails at their forward end slide has a transverse bore 30 (Figure 2) in which a pair of locking and selector members 31 and 32 are shiftable between the rails 11 and 12. In their opposed sides, the shifter rails have the locking notches 33 and 34 respectively, these notches being shown as semi-circular for receiving the semi-spherical ends of the locking members 31 and 32, the notches being opposite each other only when the shifter rails are in their neutral position as shown on Figure 2. A spring 35 pocketed within the locking members tends to hold them outwardly within the locking notches, the locking members being of such length that when engaging in the locking notches, they will be separated at their inner ends, but when one of the rails is shifted the respective locking member will be cammed out of the corresponding locking notch with its inner end abutting the other locking member and holding it firmly in the locking notch of the other rail to lock such rail against shift.

Above the bore 30 is a parallel bore 36 in which a selector bar 37 is slidable. As shown, the bar is secured to the end of a Bowden wire 38 shiftable through its sheath 39 which is secured to the head 40 anchored in the bore 36 as by a screw 41, the Bowden wire structure at its other end being connected with the manual control lever at the steering wheel of the automobile, as will be described more in detail later.

The selector bar 37 carries selector pins 42 and 43 extending through slots 44 and 45 in the surrounding frame for engagement in channels 46 and 47 in the selector members 31 and 32 respectively.

The channels 46 and 47 are of greater length than the diameters of the pins, and when the selector elements 31 and 32, and the selector bar 37, are in neutral position, the pins will be at the inner ends of the channels, as shown in Figure 1. Selection for low or reverse speed is accomplished by pull on the wire 38 to shift the selector bar 37 outwardly in the bore 36, such movement causing the pin 43 to withdraw the locking member 32 from the notch 34 in the low and reverse speed rail 11, and engagement of the pin 42 in the outer end of the channel 46 of the selector member 31 to lock this member in engagement with the notch 33 of the second and high speed shifter rail 12 to lock this rail against movement. Then, when the lever 29 is swung for swing of the cross lever 24, the lever 24 will be fulcrumed on the head of the locked second and high speed rail, and the rail 11 will be shifted for shift of the transmission gearing for reverse or low speeds, depending upon the direction of swing of the lever 29.

Selection for second or high speed is accomplished by push on the wire 38 and inward shift of the selector bar 37 for release of the locking member 31 from the rail 12 by the pin 42, and holding of the selecting member 32 in locking engagement in the notch 34 of the rail 11 by the pin 43. The cross lever 24 will now be fulcrumed on the fork head on rail 11 and the fork head on rail 12 will be shifted for either second or high speed. Upon shift of either rail, the corresponding selection member will be cammed out of the rail notch and into engagement with the other selection member to hold it in the notch of the corresponding rail and as soon as either rail is shifted, its neutral notch will be displaced from the corresponding selecting member and the cylindrical surface of the rail will be in front of the member and will prevent release of the other selecting member from the neutral notch in the other rail. It will therefore be impossible to shift both rails at the same time, and selection for desired speed is possible only when the rails have been returned to neutral position. When selection is made by shifting either of the selection members 31 and 32 away from its rail, the spring pressure of the selection members will be removed and the effort required to shift the released rail will be correspondingly reduced.

The positive locking of the rails controlled by manipulation of the clutch is best shown on Figures 1, 4, 5 and 6. Above the lugs 14 through which the rear ends of the rails 11 and 12 slide there is a transversely extending bore 48 for the locking bar 49 which terminates at its outer end in a lever 50. Between the bore 48 and the lug bores are passageways 51 and 52 respectively for locking balls 53. In alignment with the passageways 51 and 52 are notches or recesses 54 and 55 respectively in the locking bar 49, the bar being held against longitudinal displacement as by means of a pin 56 engaging in a circumferential channel 57 in the bar.

The shifter rail 12 has in its upper side three notches or pockets N, I, and H, for receiving the balls 53 when the rail is in neutral position, in intermediate gear position or in high gear position respectively. The rail 11 has on its upper side the notches or pockets N, L and R for receiving the corresponding ball 53 when the rail is in neutral position, low speed position or reverse position respectively. When the balls are in any of these pockets, they will be below the bore 48, and when the notches 54 and 55 in the locking bar 49 are out of register with the passageways 51 and 52, the locking bar will lock the balls in the respective notches of the rails to lock the rails against shifting. However, when the locking bar is turned to bring the notches into register with the passageways, the rails may be shifted as the balls will then be free to move out of the rail notches to project into the locking bar notches. Figures 4 and 5 show the balls engaging in the neutral pockets N of the rails and held in the pockets by the locking bar. When the bar 49 is turned a distance, clockwise direction Figure 5, the balls will be released and the rails free for shifting movement. Rotation of the locking bar 49 is controlled by operation of the clutch lever C. Referring to Figure 6, the clutch lever is mounted on a shaft 58 and connected by link 59 with the lever 60 on the clutch operating shaft 61. A suitable bracket structure 62 is mounted on the link 59 to move therewith and this bracket structure engages against the right side of the lower end of a lever 50 extending down from the locking bar 49. When the clutch lever is swung forwardly for disengagement of the clutch, the lever 50 will be swung for clockwise rotation of the locking bar 49 and release of the shifter rails for shifting. When the clutch lever is swung back for engagement of the clutch, a spring 63 will return the lever 50 for rotation of the locking bar in a direction to relock the shifter rails.

Normally, the shifter rails are locked in neutral position by the locking bar 49 as shown on Figure 1. Selection of a desired rail for shifting may be made at neutral position of the gears, by means of manipulation of the wire 38, regardless of whether the rails are locked or unlocked, but before shifting into gear the clutch must be disengaged to effect unlocking of the rails by the lock bar 49. After the shift has been made, the corresponding notch in the shifted rail will come into registration with the corresponding locking ball 53 so that when the clutch is re-engaged both rails will be locked in their respective positions by the locking bar 49, and the clutch will have to be again disengaged to unlock the rails before the shifted rail can be brought back to neutral position. Thus the shifter rails are locked in neutral position or in shifted position when the clutch is engaged and are released for shifting movement only when the clutch is disengaged. Cross-over can be accomplished when both rails are in neutral position due to the interlocking action of the locking plungers 31 and 32, since, except when both rails are at neutral, only one notch 33 or 34 can register with the plungers 31 and 32.

Referring to Figure 2 which shows the rail 11 locked, it will be seen that the pins 42 and 43 are both at the right hand ends of channels 46 and 47 respectively. Movement of the selector bar 37 and pins 42 and 43 half-way to the left will allow the plungers 31 and 32 to separate and occupy both locking notches 33 and 34. However, if in the position shown in Figure 2 the rail 12 is shifted, then the end of the plunger 31 will ride the cylindrical surface of the rail 12 and the pins 42 and 43 may still be moved to center or neutral position without unlocking rail 11. This condition eliminates the necessity to feel for the exact cross-over position, as when it is reached the spring loaded plunger 31 snaps into the notch, and both rails are then held in neutral or cross-over position while the cross-over is being completed.

The mechanism for controlling the selection and shifting from a remote point is shown on Figures 7, 8, and 9. The steering column of an automobile is indicated by 64, the steering shaft 65 extending through this column and terminating at its upper end in a steering wheel (not shown). Below the steering wheel end adjacent thereto is a detachable clamp comprising a body 66 clamped in place on the steering column by a U or strap bolt 67. The clamp body has a laterally extending lug 68 from which a cylindrical pin 69 depends parallel with the steering column.

A lower clamp on the steering column comprises the body 70 clamped to the column by a strap 71. The clamp body has a bearing bore therethrough provided with a bearing bushing 72, the bushing being in axial alignment with the pin 69. A tubular shaft 73 extends through the bushing 72 and at its upper end receives the pin 69, the shaft being thus vertically slidable. Just above the clamp body 70 the shaft has a lever arm 74 clamped thereto and swiveled at one end to the end of the lever is a link 75 whose other end has adjustable threaded connection with a clevis 76 which is connected by a pin 77 with the outer end of the shift lever 29 (Figure 1). Thus when the shaft 73 is rotated, the shift lever 29 will be swung for shifting of a selected shifter rail.

A bracket arm 78 depends downwardly at an angle from the clamp body 70 and a pin 79 extending through the bracket pivots a bellcrank lever 80. One leg of the bellcrank lever terminates in a circular head 81 engaging between the upper and lower flanges of a spool structure 82 which has a cylindrical lug 83 thereon extending into the lower end of the shaft 73 and rigidly secured thereto, as by welding. At the end of the other leg of the bellcrank lever a clamp 84 secures the end of the wire 38 which extends to the selector bar 37, the corresponding end of the sheath 39 being clamped to the end of the bracket 78. With this arrangement axial shift of the shaft 73 will cause rotation of the bellcrank lever 80 and pushing or pulling of the wire 38 for speed selection.

A housing 85 of inverted U shape cross section has an opening 86 partially receiving the upper end of the shaft 73, the housing being rigidly secured to the shaft as by welding of its front and end walls 87 and 88 thereto. The housing extends toward the right from the shaft and a hand lever 89 extends thereinto between the front and rear walls 87 and 90. A pin 91 extends through these walls and through a bushing 92 provided for the lever so that the lever is fulcrumed for up and down swing. At its inner end the lever is guided by the front and rear walls of the housing and has a pin 93 extending forwardly therefrom through the housing passageway 86 and through a longitudinally extending slot 94 in the shaft 73 for projection of the pin end into a slot 95 in the pin 69 which is received by the shaft. The pin 69 which extends from the clamp 66 is stationary, and the slot 95 provides a fulcrum for the pin 93 on the hand lever so that when the hand lever is swung upwardly the housing 85 will be raised and the shaft 73 shifted upwardly, the slot 94 through the shaft providing clearance for such upward shift of the shaft. The shaft 73 provides an annular shoulder 96 for a disk 97 for seating one end of a compression spring 98 within the shaft whose other end seats against the pin 69, the spring being pre-tensioned so that it will always exert normal pressure tending to hold the shaft 73 down. This spring pressure on the shaft is transmitted to the bellcrank lever 80 and through the Bowden wire 38 to the selector bar 37 to normally hold this bar at the inner end of the bore 36 for setting of the selector members 31 and 32 to release and select the fork rail 12, as shown on Figure 2. Thus, with the hand lever 89 normally in its lower horizontal field or plane, forward swing thereof will rotate the shaft 73 for shifting of the rail 12 for second speed, and rearward swing of the lever will effect shift for high speed. Before either shift is made, the clutch must be released for operation of the locking bar 49 to unlock the rails.

If it is desired to use low speed or reverse, the hand lever structure is raised into its upper plane or field, and upward lift on the lever 89, by virtue of its fulcrum connection with the pin 69 on the clamp structure 66, will raise the lever housing and the shaft 73 therewith, raising of the shaft causing rotation of the bellcrank lever 80 to exert pull on the wire 38 and outward shift of the selection bar 37 and setting of the selection members 31 and 32 to lock the rail 12 and release and select the low speed and reverse rail 11 for operation. After raising of the lever to select the rail 11, rearward swing of the lever will effect shift for low speed, and forward swing of the raised lever will effect shift for reverse drive. Raising of the lever 89 will be against the resistance of the spring 98 but when the lever is swung after raising for shifting to either low speed or reverse, the neutral notch 34 of the rail 11 will be displaced from the selection member 32 and when the lever is released after raising and swinging for shift, the spring will return the selector block 37 for engagement of its pins 42 and 43 with the right hand ends of the channels 46 and 47, and the shaft 73 and the lever 89 will be partially shifted down toward normal position. Now when the lever is swung back to its middle position for return of the rail 11 to neutral position, the selector member 32 will return into engagement with the neutral notch 34 so that the selector bar 37 and the shaft 73 may be shifted fully back to normal position by the spring 98. The rail 11 will now be locked by the selector member 32, and selector member 31 will be withdrawn from the rail 12 for shift for either second or high speed by corresponding swing of the lever 89.

I have shown and described a practical and efficient embodiment of my invention but I do not desire to be limited to the exact construction, arrangement and operation shown as changes and modifications are possible without departing from the scope and spirit of the invention.

I claim as my invention:

1. In automobile transmission control, a pair of shifter rails supporting shifter forks, said rails having each a neutral notch, a pair of latch members between said rails and a spring tending to shift said latch members into said notches when said rails are in neutral position, said latch members having longitudinally extending channels, a selector bar parallel with said latch members and having pins extending therefrom into said channels, the pin and channel arrangement being such that when said bar is shifted in one direction one of said latch members will be locked in latch engagement with one of said rails and the other latch member will be withdrawn from the notch in the other rail to free said rail for shifting movement, and means for controlling the shift of said bar.

2. In automobile transmission control, a pair of shifter rails and shifter forks supported thereby, said rails having neutral locking notches, a pair of latch members axially aligned and interposed between said rails, a spring urging said latch members apart for engagement in the neutral notches when the rails are in neutral position, said latch members having longitudinal channels, a selector bar shiftable adjacent to said latch members and having pins extending into said channels, the pin and channel arrangement being such that selective shifting of said bar in either direction will cause one of said latch members to be held in the neutral notch of one of said rails to lock said rail against shifting movement and the other latch member will be withdrawn from the neutral notch of the other rail to release said rail for shifting movement, and remote selection means for controlling the shifting of said selector bar.

3. In automobile transmission control, a pair of shifter rails and shifter forks supported thereby, said rails having neutral locking notches, a pair of latch members axially aligned and interposed between said rails, a spring urging said latch members apart for engagement in the neutral notches when the rails are in neutral position, said latch members having longitudinal channels, a selector bar shiftable adjacent to said latch members and having pins extending into said channels, the pin and channel arrangement being such that selective shifting of said bar in either direction will cause one of said latch members to be held in the neutral notch of one of said rails to lock said rail against shifting movement and the other latch member will be withdrawn from the neutral notch of the other rail to release said rail for shifting movement, and remote manually operable means for controlling the shifting of said selector bar and for controlling the shifting of the released rail.

4. In automobile transmission control, a pair of shifter rails and shifter forks extending therefrom, shifting mechanism connected with said rails and having an operating lever arm, selection means shiftable transversely of said rails for selecting either rail for shifting operation, a shaft mounted on the automobile steering column for rotary movement and for axially shiftable movement, a transmission lever operable by the axial shift of said shaft and a flexible connection between said transmission lever and said selection mechanism whereby shifting of said shaft will effect selection of a desired rail for shifting operation, a lever arm on said shaft and a link connecting said lever arm with the operating lever arm for the shifting mechanism whereby rotation of said shaft will effect shift of the selected rail, a housing secured to and extending from the upper end of said shaft, a manually operable lever pivoted intermediate its ends to said housing and having a slidable fulcrum connection at its inner end relative to said steering column whereby when said manual lever is swung up or down, said shaft will be axially shifted for selection of a desired rail and when said lever is swung sideways said shaft will be rotated for effecting shift of the selected rail.

5. In automobile transmission control, a pair of shifter rails one of which supports a shifter fork for reverse and low speeds and the other supports a shifter fork for intermediate and high speeds, said rails having each a neutral notch, axially aligned latch members interposed between said rails and spring means urging said members apart toward said rails for engagement in said neutral notches when the shifter forks are in neutral position, said latch members having abutments, a selector bar having pins for cooperating with said abutments, spring means tending to hold said selector bar in position for engagement of said pins with said latch member abutments to hold the latch member for the low and reverse speed rail in the neutral notch of said rail and to hold the other latch member out of the neutral notch of the intermediate and high speed rail to release said rail for shifting movement, and means for shifting said selector bar for actuation thereby of said latch members to release the low and reverse speed rail and lock the intermediate and high speed rail in neutral position.

6. In automobile transmission control, a pair of shifter rails one of which supports a shifter fork for low and reverse speeds and the other of which supports a shifter fork for intermediate and high speeds, said rails having neutral notches, a pair of axially aligned latch members between said rails and spring means urging said members toward said rails for engagement thereof in said neutral notches when the shifter forks are in neutral position, said latch members having abutments, a selector bar having pins for cooperating with said abutments for locking of either rail and release of the other, shifting means for said rails and a shifting lever therefor, a shaft mounted adjacent to the steering column of the automobile for axial shift and for rotation, a lever arm secured to said shaft and a link connecting said lever with the shift lever whereby rotation of said shaft will effect shift of a selected rail, a transmission lever operable by axial shift of said shaft and a link connecting said lever with said selector bar, a spring normally holding said shaft downwardly with the selector bar in position to hold said latch members to lock the low and reverse speed rail and to release the intermediate and high speed rail, a housing extending laterally from the upper end of said shaft, a manual control lever pivoted at an intermediate point to said housing for up and down swing, means fulcruming the inner end of said lever relative to said steering column so that upward swing of said lever will raise said housing and the shaft connected thereto whereby said transmission lever will be operated to cause shift of the selector bar to set the latch members for locking of the intermediate and high speed rail and release of the low and reverse speed rail and whereby side swing of said manual lever will then effect shift of the low and reverse speed rail.

HARRY L. CHISHOLM, Jr.